Dec. 27, 1932.                    J. ROWAN                    1,892,365
                              EYEGLASS MIRROR
                           Filed Nov. 13, 1930
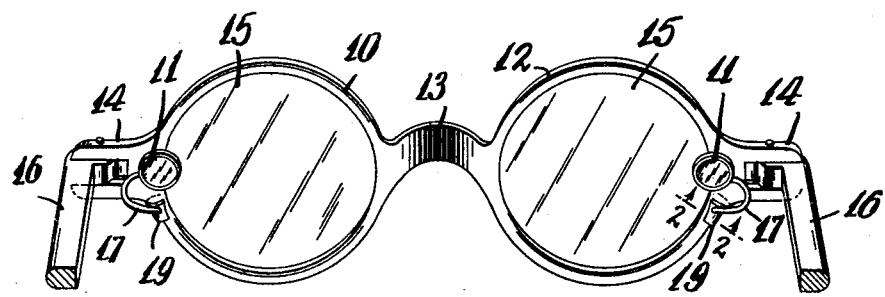
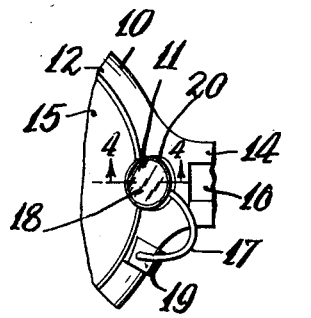
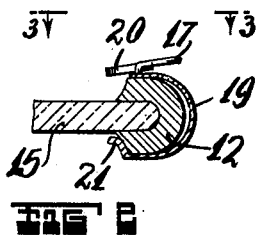
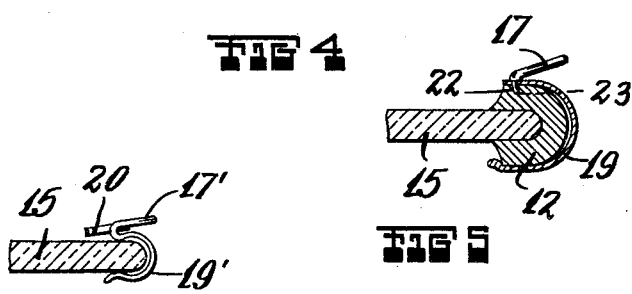
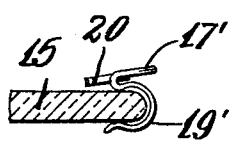
INVENTOR
John Rowan
BY
ATTORNEY Patented Dec. 27, 1932

1,892,365

UNITED STATES PATENT OFFICE

JOHN ROWAN, OF NEW YORK, N. Y.

EYEGLASS MIRROR

Application filed November 13, 1930. Serial No. 495,335.

This invention relates to new and useful improvements in an eyeglass mirror.

The invention relates to similar subject matter as that disclosed in my copending applications, Serial No. 467,226, filed on the 11th day of July, 1930, and Serial No. 487,104, filed on the 8th day of October, 1930.

I have been seeking to produce a simple structure for holding a mirror upon eyeglasses so as to be adjustable to all angles whether horizontal, vertical or any other direction to allow lateral and rear viewing. It is my intention to produce the adjustable arrangement with the very least number of possible parts and so constructed as to have the greatest degree of adjustability. Further, that the adjusted operation be extremely simple.

It is an object of this invention to provide a gooseneck of pliable non-resilient material supporting a mirror at one end and for attachment at the other end upon the eyeglasses.

It is another object of this invention to provide a gooseneck of resilient material supporting a mirror at one end and for attachment at the other end upon eyeglasses.

As a still further object of this invention it is proposed to arrange a clamp upon the end of the gooseneck opposite the end which supports the mirror so that the gooseneck may be clamped upon eyeglasses.

It is a further object of this invention to provide a casing for holding the mirror and to arrange the gooseneck attached upon the casing to accomplish the supporting of the mirror.

As a further object of this invention it is proposed to provide a casing supporting a mirror and having its other end reduced and extended through a clamp and thus soldered in place so that the projecting reduced portion may engage an aperture in the eyeglasses and hold the mirror from slipping along.

As a still further object it is proposed to arrange the gooseneck with a bent portion at the end opposite the end which supports the frame, so shaped as to simulate a clamp for attaching the device upon eyeglasses.

As a still further object of this invention it is proposed to provide a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of the disclosure:—

Fig. 1 is a fragmentary perspective view of a pair of eyeglasses with eyeglass mirrors constructed according to this invention.

Fig. 2 is a fragmentary enlarged sectional view taken on the line 2—2 of Fig. 1.

Fig. 3 is a fragmentary elevational view looking in the direction of the line 3—3 of Fig. 2.

Fig. 4 is an enlarged sectional view taken on the line 4—4 of Fig. 3.

Fig. 5 is a view similar to Fig. 2, but illustrating a modified form.

Fig. 6 is another view similar to Fig. 2, but illustrating a still further modified arrangement.

In Fig. 1 a pair of eyeglasses 10 have been illustrated provided with eyeglass mirrors 11 constructed according to this invention. These mirrors are arranged at the outer sides of the eyeglasses. The eyeglasses 10 are shown to comprise a frame 12 having a nose bridge 13 and outer lugs 14. Lenses 15 are arranged within the frame for positioning to the front of one's eyes. Ear bars 16 are pivotally connected with the lugs 14.

Each of the eyeglass mirrors comprises a gooseneck 17 of pliable non-resilient material, or of resilient material, a mirror 18 attached upon one end of said gooseneck, and means 19 on the other end of the gooseneck for mounting on the frame or the like of a pair of glasses.

The gooseneck 17 is in the form of a wire and is shown bent outwards relative to the supporting means 19 and the lenses 15 so as to be disposed to the rear of the lugs 14 in lieu of extending across a portion of the lenses 15. If the gooseneck is of pliable non-resilient material, it may be bent as desired and maintain the new positions for holding the mirrors in the plane wanted. If the gooseneck is of resilient material, it is harder to set the mirrors in position. This may be done by applying heat or in any other known manner. Of course, one set has the advantage of not being readily pushed out of place, since it will always spring back to its set position.

The mirror 18 is shown supported within a casing 20, and the casing in turn is attached upon the gooseneck 19. The mirror 18 is shown flush with the top face of the casing, illustrated very clearly in Fig. 4. Further, the top edge of the casing is pinned over so as to hold the mirror in place. The casing and the mirror are both shown of circular construction, though this is not intended as a limitation since any other form may be used. The means 19 for holding the gooseneck upon the eyeglasses is in the form of a resilient clamp, which may be engaged upon the frame of the glasses. This clamp is shown with a curved end 21 adapting it to be pressed onto place on the frame, or to be pulled off of the frame.

In the modified form of the device illustrated in Fig. 5, a means has been shown for preventing the eyeglass mirror from slipping along on the frame. This means is in the form of a reduced end 22 of the gooseneck 17 and extending through an aperture in the clamp 19 so as to project from the inner face of the clamp. The casing preferably should be soldered or pressed, or attached in any other manner on the frame. The projecting reduced end is intended for engaging within an aperture 23 formed in the frame of the glasses, and this prohibits sliding along. The reducing of the end of the gooseneck is a very simple operation and this manner of accomplishing the object desired is of extreme advantage.

In Fig. 6 another modified form of the device has been illustrated, in which the gooseneck 17' is bent at the end opposite the end which supports the mirror and is in the shape of a clamp 19'. This allows the mirror to be directly pressed upon the eyeglasses. Also, in Fig. 6, just lenses 15' of eyeglasses has been shown to illustrate that the mirror is also adapted for engaging onto glasses not having frames, such as spectacles.

The operation of the device may be traced by assuming a pair of eyeglasses with the eyeglass mirrors as shown in Fig. 1. These glasses may be worn in a conventional manner and the wearer may look into the mirrors to see sidewards and rearwards. In the event that the angle of vision is not exactly what the wearer desires, he need only remove the glasses temporarily and bend the gooseneck. When the gooseneck is of pliable non-resilient material, it will maintain the new set position. If of resilient material, the application of heat will be necessary. Whenever the eyeglass mirrors are not desired, they may be removed from the eyeglasses by simply pulling the clamps off.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An eyeglass mirror for eyeglasses and the like, comprising a gooseneck of pliable non-resilient material, a mirror attached on one end of said gooseneck, and means on the other end of said gooseneck for mounting on the frame or the like of a pair of eyeglasses.

2. In an eyeglass mirror for eyeglasses and the like, a gooseneck of pliable non-resilient material for supporting a mirror attached on one end of said gooseneck, means on the other end of said gooseneck for mounting on the frame or the like of a pair of eyeglasses, and means for preventing slippage of the mirror along the frame of the glasses, comprising a reduced end formed on said gooseneck and extended through said means for mounting and for engaging within an aperture formed in the frame of said glasses.

In testimony whereof I have affixed my signature.

JOHN ROWAN.